United States Patent [19]

Noguchi et al.

[11] E Patent Number: Re. 33,424

[45] Reissued Date of Patent: Nov. 6, 1990

[54] APPARATUS AND METHOD FOR MEASURING THE DEPTH OF FINE ENGRAVED PATTERNS

[75] Inventors: Minori Noguchi, Yokohama; Toru Otsubo, Fujisawa; Susumu Aiuchi, Yokohama, all of Japan

[73] Assignee: Hitachi, Ltd., Tokyo, Japan

[21] Appl. No.: 254,964

[22] Filed: Oct. 7, 1988

Related U.S. Patent Documents

Reissue of:

[64] Patent No.: 4,615,620
Issued: Oct. 7, 1986
Appl. No.: 685,550
Filed: Dec. 24, 1984

[51] Int. Cl.[5] ..... G01B 11/22

[52] U.S. Cl. ..... 356/378; 356/355; 356/446

[58] Field of Search ..... 356/354, 355, 356, 357, 356/358, 371, 378, 381, 382, 237, 445, 446, 447

[56] References Cited

U.S. PATENT DOCUMENTS 4,303,341 12/1981 Kleinknecht et al. ..... 356/355
4,498,772 2/1985 Jastrzebski et al. ..... 356/382

FOREIGN PATENT DOCUMENTS 4838169 9/1971 Japan .
54-17872 2/1979 Japan .

*Primary Examiner*—Vincent P. McGraw
*Assistant Examiner*—S. A. Turner
*Attorney, Agent, or Firm*—Antonelli, Terry, Stout & Kraus

[57] ABSTRACT

An apparatus *and method* for measuring in a non-contact manner the depth of pits and grooves formed by etching in periodic patterns on the surface of a substrate. The measurement is based on the detection of the intensity of a diffraction ray excluding that of the 0th order through the irradiation of a light beam with variable wave length to the sample. Whereas, the conventional measuring system is sensitive to a diffraction ray of the 0th order, i.e., the major component of the reflected light, that hampers the detection of a higher order diffraction ray carrying information of the depth.

26 Claims, 14 Drawing Sheets

CROSS SECTION

CROSS SECTION

APPARATUS AND METHOD FOR MEASURING THE DEPTH OF FINE ENGRAVED PATTERNS

Matter enclosed in heavy brackets [ ] appears in the original patent but forms no part of this reissue specification; matter printed in italics indicates the additions made by reissue.

BACKGROUND OF THE INVENTION

The present invention relates to the technological field of optical apparatus and, particularly, to an optical apparatus combined with a mechanical scanning device for measuring the depth of grooves forming fine circuit patterns on a semiconductor substrate.

In pursuit of more highly integrated semiconductor devices, the semiconductor circuit design is coming to a turning point from the conventional planar device structure to a cubical device structure. On this account, the technique of measuring the depth of etched grooves in a semiconductor substrate becomes indispesnsable. Such etched grooves are designed to have a depth of 3–5 μm and a width of 1–2 μm, but it is not easy to measure the actual etch depth. The following are publications disclosing techniques of measuring the depth or thickness of a fine structure.

(a) Japanese Patent Application Laid-open No. 54-17872

This patent discloses the method of measuring in a non-contact manner the depth of pit patterns on an optical video disk by use of the interference of light with a variable wavelength. However, this method is not effective for measuring the depth of etched pits and grooves with an extremely small area of opening as compared with the unworked surface, for which the present invention aims to offer, because the amount of light reflected from a pit is not large enough for the cited measuring method to detect. Namely, the range of variation (contrast) of the interference light intensity between the reflected light from the pit and the reflected light from the unworked surface is too small, making it difficult to detect the interference light.

(b) Japanese Patent Application Laid-open No. 48-38169

This patent discloses the method and apparatus for measuring the reflectivity and thickness of a thin film by varying the incident angle of the measuring light beam. However, this method and apparatus are designed to measure the thickness of a polymer film or the like applied uniformly on a plane, and do not have the accuracy of measurement to an extent of calculating the depth of fine pits and grooves which the present invention aims to deal with. The reason is that the method is based on the direct detection of the reflected light at its maximum intensity in response to the incident light.

(c) Article entitled, "Optical Monitoring of the Etching of $SiO_2$ and $SiN_4$ on Si by the Use of Grating Test Pattern", Solid State Science & Technology, 1973, Vol. 5, H. P. Kleinknecht and H. Meier This publication introduces a technique for measuring the depth of etching during the process by the horizontal interference method using the diffraction light. This method uses the He-Ne laser to irradiate a sample with a beam of single wavelength and detects the variation of the intensity of interference light caused by the changing depth during the etching process. However, this method cannot be applied to the inspection process for measuring the depth of etching after the process has completed.

As concerned with the above citations (a) and (b), the following points out the fact that a sufficient variation of intensity of the interference light cannot be obtained in these methods.

Assuming parallel slits with a slit width of a, a slit pitch of l and the number of slits of N, when a coherent light with a wavelength of λ is projected to the slits, the intensity distribution I of the diffraction image in the Fraunhofer region with a distance of b is in accord with the following expression.

$$I \alpha \left( a \frac{\min\left(\pi \frac{ax}{\lambda b}\right)}{\pi \frac{ax}{\lambda b}} \right)^2 \cdot \left( \frac{\min\left(\pi \frac{lx}{\lambda b}(2N+1)\right)}{\min\left(\pi \frac{lx}{\lambda b}\right)} \right)^2 \quad \text{(i)}$$

where x represents the position on the screen in the Fraunhofer region measured from the reference point of the straight light path.

Accordingly, the intensity in the direction of $x=0$ (diffraction direction of 0th order) is proportional to the square of the slit width a. In case square pits 17 are formed as shown in FIG. 3 in the relationship of $a/l=1/10$ for the pit width a and pit pitch l in both the longitudinal and lateral directions, the ratio of the reflected light intensity $I_b$ at the bottom surface 19 of a pit to the reflected light intensity $I_s$ at the surface 18 is $I_b/I_s=1/10{,}000$, resulting from the application of the above relation $I_{b\alpha a}{}^2$ twice for the longitudinal and lateral directions. Accordingly, the light intensity $I_\lambda$ detected by the optical sensor is expressed in terms of the wavelength λ of the light and the depth h of the pit as follows.

$$I_\lambda \alpha I_s + I_b - 2\sqrt{I_s}\cdot\sqrt{I_b}\cos\left(4\pi\frac{h}{\lambda}\right) \approx I_s - \frac{1}{50} I_s \cos\left(4\pi\frac{h}{\lambda}\right) \quad \text{(ii)}$$

As shown by the above equation, when the bottom area 19 of the pit and the remaining surface area 18 differ as much as 1/100, the variation in the intensity of interference light caused by the normal reflection on the two faces (in direction perpendicular to the sample surface) is as small as 1/50, and therefore it is difficult to detect the variation of the light intensity. This is due do the signal-to-noise (S/N) ratio of the optical sensor, that is generally limited to about 20, and it is difficult for such an optical sensor to discriminate a 1/50 variation of light intensity from noises, and thus it is difficult to measure the depth of ethching.

As described above, the prior art methods for measuring the depth of pits and grooves are limited in detecting the variation of measuring light intensity, and they are not capable of measuring the depth of fine pits and grooves.

SUMMARY OF THE INVENTION

An object of the present invention is to provide an apparatus *and method* for measuring in non-contact manner the depth of fine pits and grooves formed by etching in a semiconductor substrate which could not be achieved by the conventional methods.

Another object of the invention is to provide an apparatus *and method* for measuring accurately the depth of pits and grooves forming fine patterns by way of varying the wavelength of measuring light while retaining the intensity of interference light.

The invention features that the amount of light reflected on an etched portion (concavity) and an unworked portion (convexity) is made substantially equal, so that a large variation of intensity (contrast) of the interference light is obtained. More particularly, basing on the fact that a concave portion and convex portion provide substantially the same amount of reflection for high-order diffraction rays excluding the 0th order diffraction ray, as suggested by the diffraction phenomenon in the Fraunhofer region and the Babinet's principle, the depth of fine pits and grooves is detected from the intensity distribution of high-order diffraction rays through the operation of varying the wavelength of incident light.

DESCRIPTION OF THE PREFERRED EMBODIMENT

The present invention is based on the Babinet's principle in which the diffraction images in the Fraunhofer region originating from two complementary (positive and negative) patterns are equal in the light intensity and out of phase by $\pi$ from each other except at the central point (0th order diffraction image). Namely, the present invention resides in the technique of measuring the depth of pits and grooves by utilization of the interference of light, particularly, the nature of the light that when a light beam is projected to a fine pit or groove formed in a substrate, the reflection on the substrate surface and the bottom surface of the pit or groove produces an equal intensity of diffraction rays by interruption and selection as stated in the Babinet's principle.

By irradiating a substrate in which a fine pit or groove is formed with the measurement light with varying wavelength, with an optical sensor placed at positions where the amplitude intensity arises (positions of diffraction rays other than 0th order), the intensity distribution depending on the depth of the pit or groove is measured. From the wavelength at the peak of distribution, the depth of the pit or groove can be determined. Namely, the depth is calculated from the intensity distribution (function of the wavelength) of diffracted rays other than the 0th order one, containing information of the depth and providing satisfactory interference for observation.

(1) Summary of Babinet's principle

Figure 3:
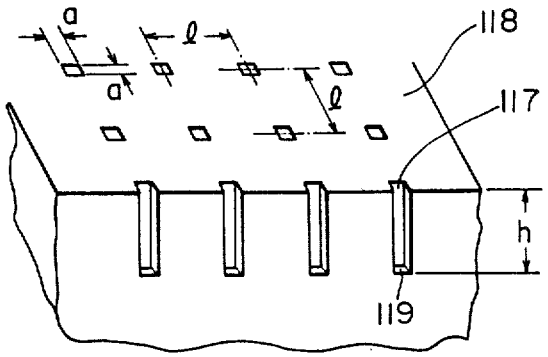
FIG. 3 is a perspective view showing an example of a fine pattern.

Suppose etched patterns formed in a semiconductor substrate as shown in FIG. 3. The patterns are made in an array of square pits with an opening area of a $\mu$m by a $\mu$m, a depth of h $\mu$m, and an alignment interval of 1 $\mu$m. It is assumed that the area of pits and the area of unworked surface are in a ratio of b:s.

Figure 4:
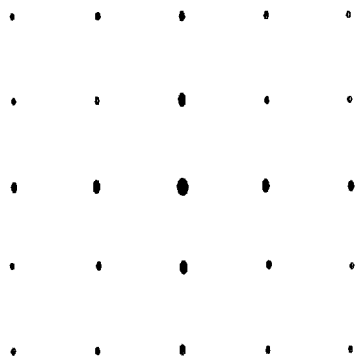
FIG. 4 is an illustration showing diffraction images.
Figure 5A:
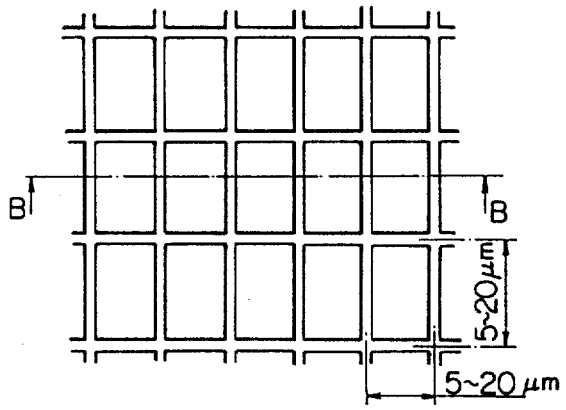
FIGS. 5a and 5b are planar and cross-sectional views of fine patterns of grooves.
Figure 5B:
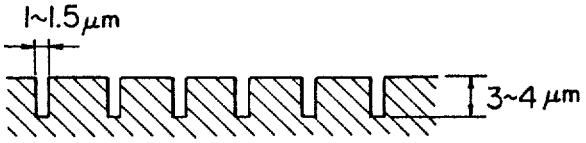
Figure 6A:
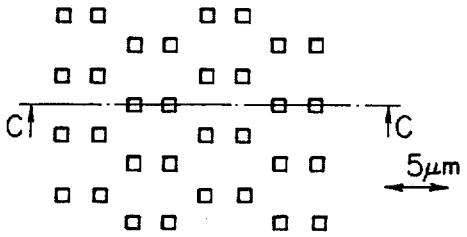
FIGS. 6a and 6b are planar and cross-sectional views of fine patterns of pits.
Figure 6B:
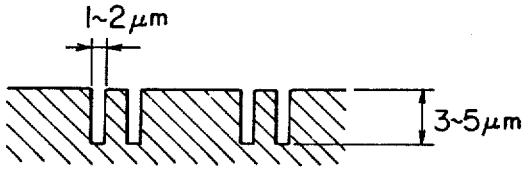

When the light is projected perpendicularly to a wide area around a pit, the reflected light produces diffraction images as shown in FIG. 4. The central image is called the 0th order diffraction image, and the number of order is incremented such as the 1st order, 2nd order, up to the nth order as the position of images shifts outwardly, with their intensity being termed $I^1, I^2, \ldots, I^n$, correspondingly. Generically, $I^n$ represents the interference light intensity caused by the light reflected on the bottom of the pit and diffracted at the pit opening and the light reflected and diffracted on the substrate surface, and two components of intensity causing the interference will be termed $I_b^n$ and $I_s^n$. The light entering a pit is attenuated, and comes out of the pit with amplification $\alpha$ ($\lambda < 1$).

This pattern model comprising pits (etched portion) and unworked portion is a typical complementary pattern to which the Babinet's principle is pertinent. Although in actual the wave surface of a light beam entering and coming out of a pit is disturbed and thus different from that at entry, it is considered to be an approximately complementary pattern, and the following equation is held.

$$aI_s^n = I_b^n \quad (1)$$

The ratio of areas of the pit portion and other portion gives $$\frac{I_s^0 + \sum_{i=1}^{n} I_s^i}{I_b^0 + \sum_{i=1}^{n} I_b^i} = \frac{s}{ab} \tag{2}$$

For $I_b^0$ and $I_s^0$, the following equation is known to establish by taking a limit of $x_i \to 0$ and $y_i \to 0$ in the Fraunhofer's approximate equation derived from the Fresnel-Kirchhoff's equation.

$$I^0 = \left| \lim_{\substack{x_i \to 0 \\ y_i \to 0}} m(x_b y_i) \right|^2 = \left| \frac{\exp(jkzi)}{j\lambda zi} \iint_{-\infty}^{+\infty} g(x_o, y_o) dx_o dy_o \right|^2 \tag{3}$$

where $g(x_o, y_o)$ and $u(x_i, y_i)$ are intensity distributions at points $(x_o, y_o)$ and $(x_i, Y_i)$ on the planes of opening and diffraction image, respectively, j is th eimaginary unit, and k is the wave vector $(2\pi/\lambda)$.

Since the term of double integral is $g(x_i, y_i)=1$, i.e., implying the area of opening having a constant amplitude distribution, $I^0$ is proportional to the square of the area of the opening. Accordingly, it gives $$\frac{I_s^0}{I_b^0} = \frac{S^2}{ab^2} \tag{4}$$

From the above equations (1), (2) and (4), it gives $$\frac{S^2}{I_s^0} = \frac{ab^2}{I_b^0} = \frac{sb}{\Sigma I_s^n} = \frac{asb}{\Sigma I_b^n} \tag{5}$$

$$\frac{sb}{I_s^n} = \frac{asb}{I_b^n} \tag{6}$$

From equations (5) and (6), intensity $I^0$ produced by the interference of $I_s^0$ and $I_b^0$, and intensity $I^n$ produced by the interference of $I_s^n$ and $I_b^n$ are obtained as follows.

$$I^0 = S^2 + ab^2 + 2\sqrt{a}\, Sb \cos(4\pi h/\lambda) \tag{7}$$

$$I^n = (1+a)Sb - 2\sqrt{a}\, Sb \cos(4\pi h/\lambda) \tag{8}$$

From the equations (7) and (8), contrast $C^0$ and $C^n$ in the intensity variation of $I^0$ and $I^n$ is given as follows.

$$C^o = \frac{2\sqrt{\alpha}\, Sb}{S^2 + ab^2} \tag{9}$$

$$C^n = \frac{2\sqrt{\alpha}}{1+\alpha} \tag{10}$$

Substituting $b/s=0.01$ and $a=0.5$ to equations (9) and (10) gives $C^0=0.014$, and $C^n=0.943$.

The above theoretical calculation indicates that the diffraction ray of 0th order gives a contrast of as small as 1%, whereas the diffraction ray of nth order provides a high contrast of 94% . In conclusion, by detecting the intensity variation of the diffraction ray of nth order, the depth of fine pits and grooves can be measured.

(2) First embodiment

An embodiment of the present invention will now be described with reference to FIGS. 1 through 4, FIGS. 5a and 5b, and FIGS. 6a and 6b. The inventive detection system does not use the diffraction ray of 0th order as of the case of the conventional measuring system, but detects the diffraction ray of the 1st or higher order and measures the intensity variation while scanning the wavelength.

Figure 1:
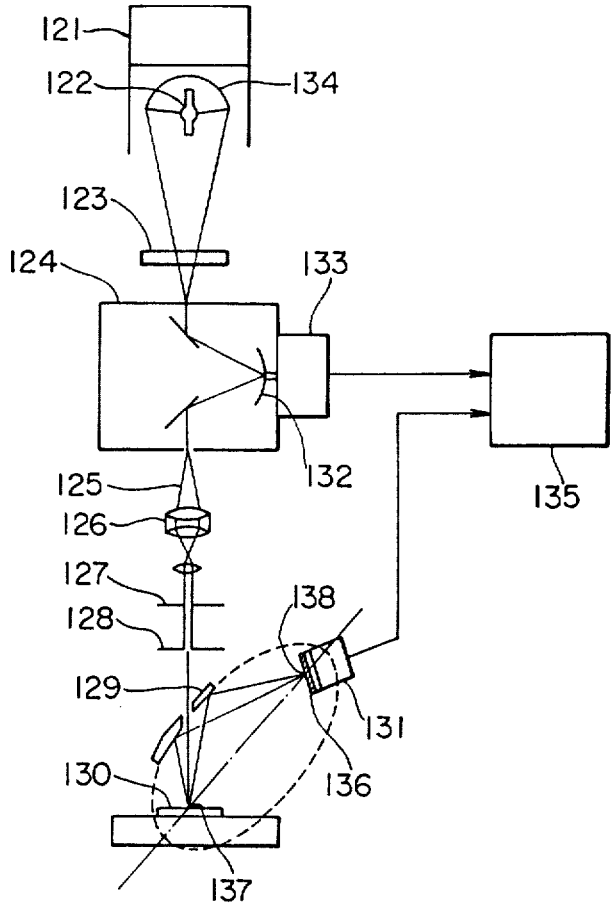
FIG. 1 is a schematic diagram showing the apparatus for measuring the depth of fine patterns embodying the present invention.

The apparatus for measuring the depth of fine patterns according to the first embodiment of the invention is principally made up of a light source 122, a spectroscope 124, an optical system 126 and an optical sensor 131 as shown in FIG. 1. The light source 122 employs a high intensity xenon lamp, halogen lamp or tungsten lamp, which is cooled by a blower 121. The light source 122 is provided with a concave mirror 134 focused on the slit of the spectroscope 124 so that the light is incident to it effectively. A light beam 125 conditioned spectroscopically is formed in a parallel beam with a diameter of 2-3 mm by the optical system 126 and slits 127 and 128, and it is projected on to a sample 130 under measurement.

The light reflected, diffracted and interfered on the sample 130 is collected by a concave mirror 129 and conducted to the optical sensor 131 located at the focal point of the mirror 129, then the intensity of light measured by the optical sensor 131 is sent to a signal processing system 135.

The spectroscope 124 has its diffraction grating 132 rotated by a drive system 133, so that the wavelength of measurement light is varied automatically with information on the grating direction, i.e., information on the wavelength of spectroscope, being indicated to the processing system 135. An infrared cut filter 123 is inserted at the output of the light source 122 so that the spectroscope 124 and following optical system are protected from heating.

The sample 130 has etched pit patterns as shown in FIG. 3. The intensity of light reflected and diffracted on the unworked surface 118 and the bottom surface 119 of a pit is dependent solely on the amplitude reflectance of each surface. Terming the amplitude reflectance of the surfaces 118 and 119 to be $r_s$ and $r_b$, respectively, and the wavelength of the measurement light be $\lambda$, the intensity $I_\lambda$ of diffraction ray of the nth order is given by the following expression.

$$I_\lambda \, a \, |r_s|^2 + |r_b|^2 - 2|r_s||r_b| \cos\left(\frac{4\pi k}{\lambda}\right). \tag{11}$$

The direction $\theta$ of the diffraction ray is given by the following equation.

$$O = \sin^{-1}\left(s\frac{\lambda}{l}\right) \tag{12}$$

Figure 2:
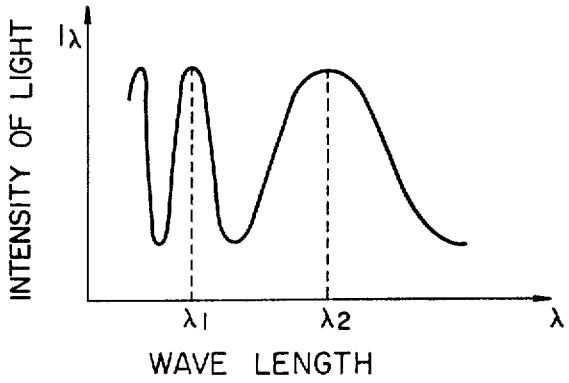
FIG. 2 is a graph showing a light intensity distribution measured by the apparatus of FIG. 1.

FIG. 2 depicts the expression (11) in a graph. Terming the wavelengths at which the intensity $I_\lambda$ takes peaks to be $\lambda_1$ and $\lambda_2$ the depth h of the pit is expressed by the following equation.

$$[k = \frac{\lambda_1 \cdot \lambda_2}{o(\lambda_2 - \lambda_1)}] \; h = \frac{\lambda_1 \cdot \lambda_2}{2(\lambda_2 - \lambda_1)} \quad (13)$$

Accordingly, the pit depth can be measured by detecting the wavelengths $\lambda_1$ and $\lambda_2$ at which the intensity $I_{80}$ takes peaks.

The signal processing system 135 shown in FIG. 1 receives the signal of wavelength from the spectroscope 124 and the signal of intensity from the optical sensor 131 so as to determine the wavelengths $\lambda_1$ and $\lambda_2$ of FIG. 2, and calculates the depth h using the equation (13).

The direction of diffraction varies in response to the scanning of the wavelength $\lambda$ as expressed by the equation (12). The use of the concave mirror 129 is to deliver the diffraction ray in variable direction to the optical sensor 131 at a fixed position. For this purpose, the concave mirror 129 has a form of ellipsoidal surface of revolution with its focal points 137 and 138 being set to the positions on the sample 130 and the sensing plane of the optical sensor 131 which is provided with a diffusion plate 136 for cancelling the effect of incident angle on the measurement.

Figure 23:
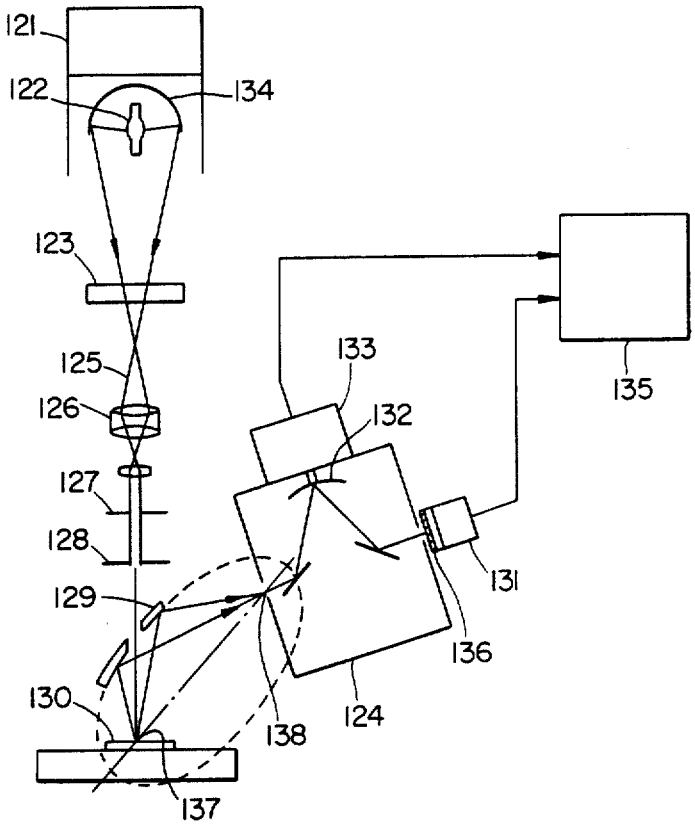
*FIG. 23 is a schematic diagram showing the apparatus for measuring the depth of fine patterns in accordance with a further embodiment of the present invention.*

Although in the above embodiment the white light is initially conditioned spectroscopically before being projected to the sample and the intensity of interference light with variable wavelength is measured, the same result will be obtained by projecting the white light to the sample and processing spectroscopically the reflected and diffracted ray before measuring the intensity of interference light with variable wavelength *as shown in FIG. 23.*

According to the foregoing embodiment, the intensity of light reflected on the etched portion and the unworked portion can be made substantially equal even in the case of an etched pattern with a very small engraved area relative to a large unworked area, as well as in the case of an etched pattern with similar areas of both portions, whereby the depth of pits and grooves with a very small bottom area can be measured.

(3) Second embodiment

Another embodiment of the invention will be described with reference to FIGS. 7 through 22. The principle, arrangement and operation of the embodiment will be explained in the separate paragraphs.

a. Application of Babinet's principle to the surface with various engraved patterns For the measurment of the depth of engraved patterns shown in FIG. 17, it is necessary to deal with diffraction images formed by slits of N in number with a width of d. The diffraction ray has an intensity distribution as shown by the curve 1 in FIG. 15, and the intensity is expressed by the following equation.

$$I = Io \cdot \left[ \frac{\sin \frac{\pi l}{\lambda b} (2N + 1)x}{\sin \left( \frac{\pi l}{\lambda b} x \right)} \right]^2 \cdot \left[ \frac{\sin \left( \frac{\pi dx}{\lambda b} \right)}{\pi dx/\lambda b} \right]^2 \quad (21)$$

where Io is the intensity at the center of the diffraction image, l is the slit pitch, $\lambda$ is the wavelength of light, b is the distance from the slit to the plane of diffraction image, and x is the distance from the center of the diffraction image to a point on the image plane.

Figure 15:
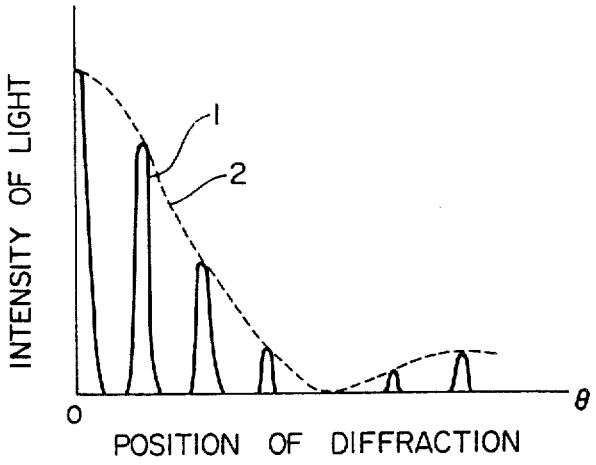
FIG. 15 is a graph showing the intensity of diffraction light.

The dashed envelope 2 on the graph of FIG. 15 indicates the intensity distribution of the diffraction image formed by a single slit with a width of d, and from Equation (21) the envelope 2 falls to a zero level when the following equation is met.

$$\sin 0 = \frac{x}{b} = \frac{m\lambda}{d} \quad (22)$$

When N is a sufficiently large number, sharp peaks arise due to multiple interference, and their position is in compliance with the following equation.

$$\sin 0 = \frac{x}{b} = \frac{m\lambda}{l} \quad (23)$$

In Equations (22) and (23), m is an integer and $\theta$ represents the angle of direction.

Figure 16:
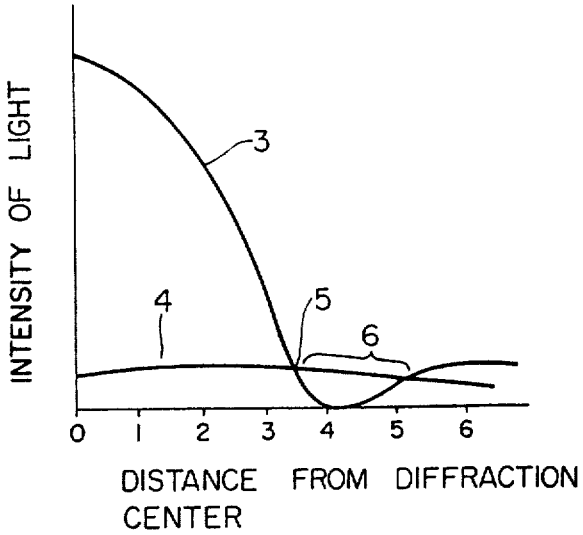
FIG. 16 is a graph comparing two diffraction images.

Accordingly, slits of different widths create diffraction patterns as shown by the curves 3 and 4 in FIG. 16, in which the areas defined by the x axis and each of the curves indicate the amount of light of each case. As can be seen from Equation (21), the slit providing the curve 4 has the smaller width and less amount of light. At point 5, the two slits provide the same amount of light, and in region 6 the slit providing the curve 4 has much amount of light.

Figure 17:
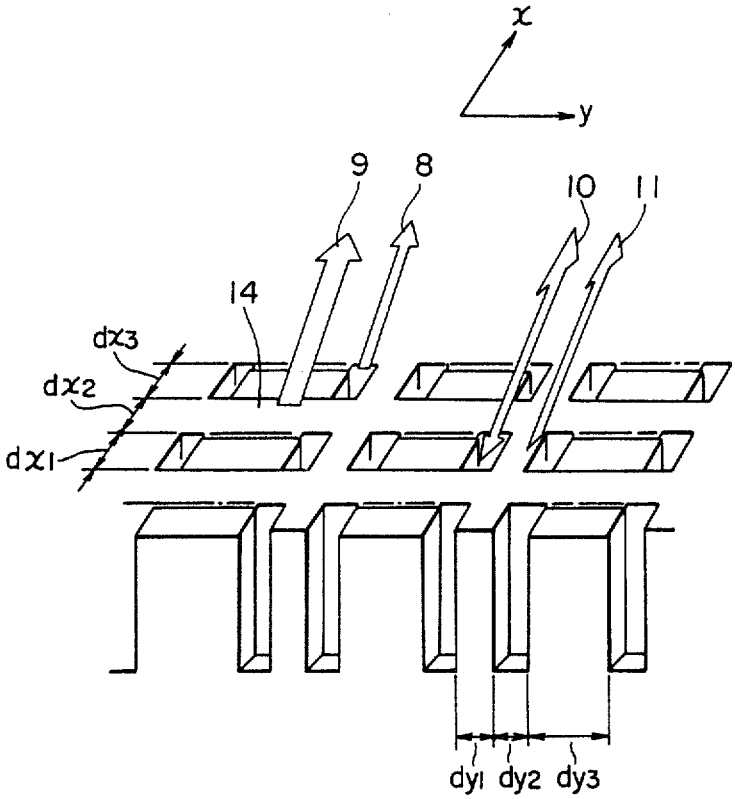
FIG. 17 is a cross-sectional view of a sample.
Figure 18:
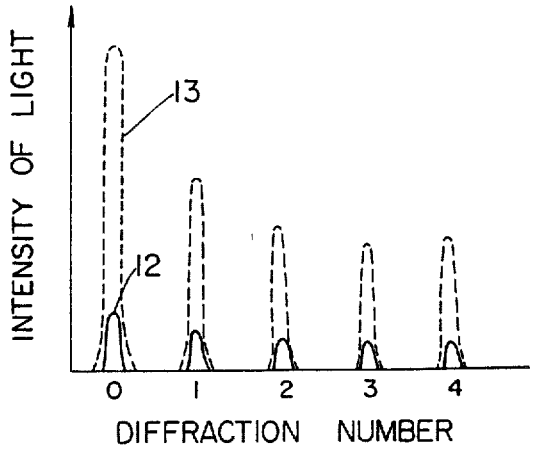
FIGS. 18 and 19 are graphs showing the intensity of diffraction ray.
Figure 19:
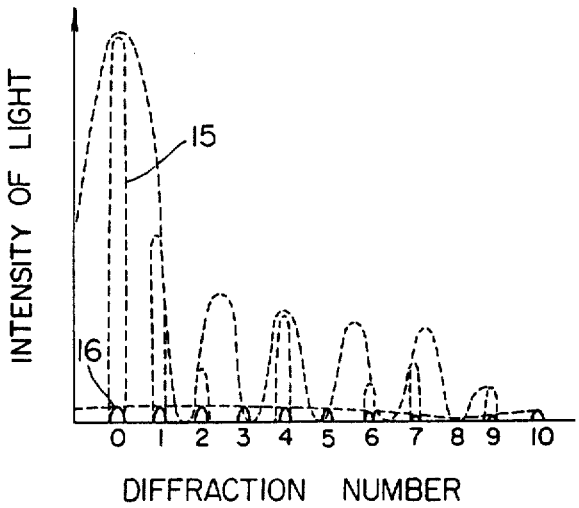

The following deal with the diffraction images caused by the engraved patterns shown in FIG. 17. The patterns are made to have a substantially same dimension for $dx_1$, $dx_2$ and $dx_3$, and therefore diffraction rays 8 and 9 in the x direction produce diffraction images of the same shape. The unworked portion has the larger area than the area of the pit portion ($dy_3 > dy_2$), and therefore the diffraction image caused by the reflection on the bottom of a pit is smaller as shown by the curve 12 in FIG. 18 than the diffraction image caused by the reflection on the unworked surface as shown by the curve 13, resulting in a smaller contrast of interference, and therefore measurement is difficult.

In the y direction, dimension $dy_1$ is substantially equal to $dy_2$, and $dy_3$ is larger than the former ones. The surface portion 14 has no diffraction ray in the y direction. Accordingly, a diffraction ray 11 caused by $dy_3$ includes smaller orders of diffraction as shown by the curve 15 in FIG. 19 than a diffraction ray 10 caused by $dy_2$ as shown by the curve 16.

Calculation for the case of $dy_1 = dy_2 1$ $\mu$m and $dy_3 = 5$ $\mu$m shows that the measurement at a large contrast is made possible through the detection of the third or fifth order diffraction rays ($m=3$, $m=5$) as given by Equations (22) and (23). Namely, for measuring the depth of the engraved pattern shown in FIG. 17, the third or fifth diffraction ray in the y direction should be detected. For more complex patterns, it would be difficult to set up such as measurement procedure from the surface layout of patterns, and in these cases diffraction images providing a contrast of intensity need to be selected from all diffraction images.

b. Arrangement of apparatus

Figure 7:
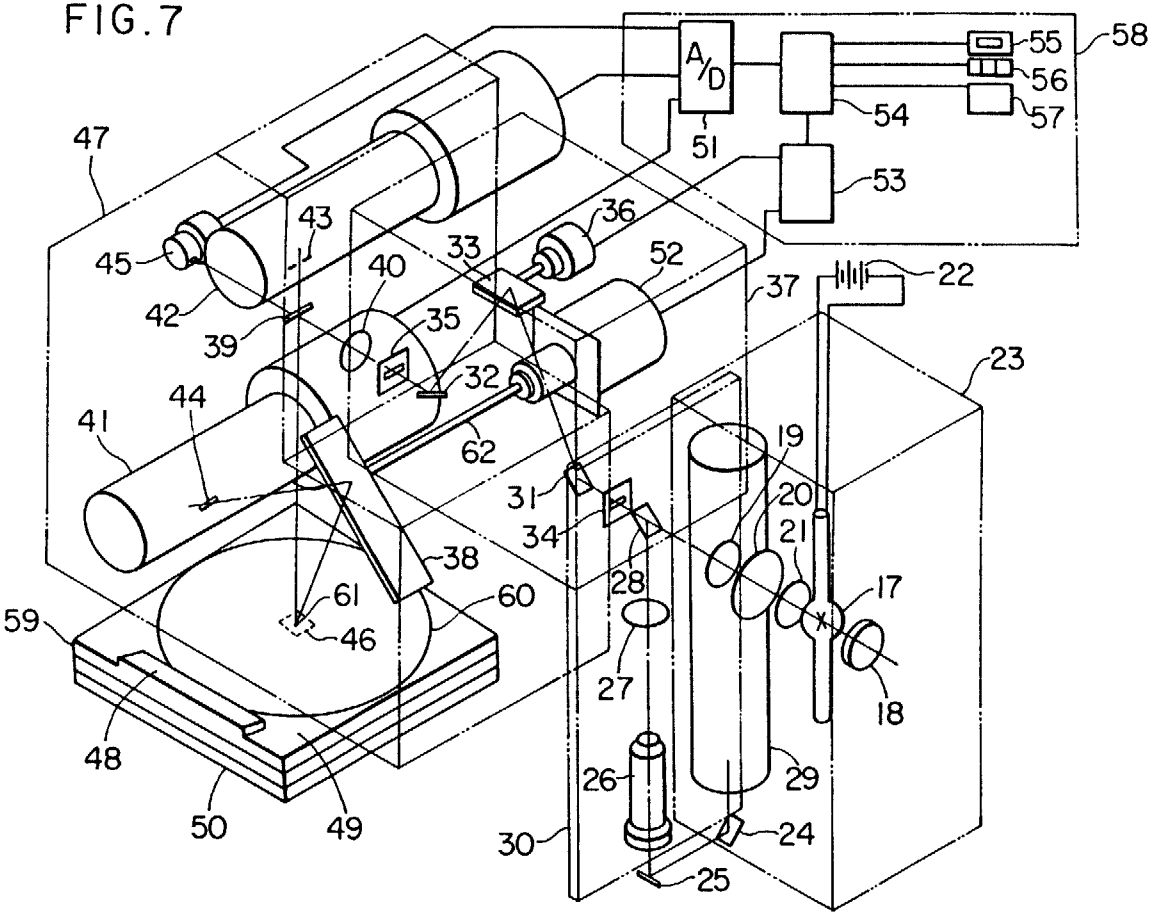
FIG. 7 is a schematic diagram showing another embodiment of the present invention.

The arrangement of this embodiment principally comprises a light source section 23, a laser light source section 30, a monochromator section 37, an optical sensor section 47, a sample positioning section 59, and a data processing section 58, as shown in FIG. 7. The light source section 23 includes a light source 17, lenses 19, 20 and 21, a spherical mirror 18, and a voltage source 22. The laser light source section 30 includes mirrors 24 and 25, a half mirror 28, an objective lens 26, a lens system 27 and a He-Ne laser source 29. The monochromator section 37 includes mirrors 31 and 32, slits 34 and 35, a concave diffraction grating 33, and a stepping motor 36. The optical sensor section 47 includes a lens 40, a half mirror 39, a mirror 38, an optical sensor 45, optical sensors 41 and 42, slits 43 and 44, a light conductive opening 46, and a stepping motor 52. The sample positioning section 59 includes an orientation bar 48, and an X-Y scanning stage 50 mounting a wafer table 49. The data processing section 58 includes an anglog-to-digital converter 51, a motor control system 53, a CRT monitor 55, a microcomputer 54, a printer 57, and a 7-segment display panel 56.

The light source section 23 is provided therein with the lenses 19, 20 and 21 and the spherical mirror 18 so that the light beam produced by a high intensity xenon lamp 17 is incident efficiently to the slit 34 of the monochromator 37. The light source 17 is required to much include wavelengths ranging 300–800 nm, and a xenon lamp is suited for this purpose, or a mercury lamp including shorter wavelengths or a halogen lamp may also be used. The lens system for collecting and introducing the light into the slit may be replaced with an ellipsoidal mirror.

The following describes how to choose the wavelength range for the light source. Terming the pitch of a diffraction grating to be 1, the wavelength be $\lambda$ and the diffraction angle of the diffraction ray be $\theta$, $$\sin 0 = \frac{m\lambda}{l} \tag{24'}$$

For the presence of a diffraction ray there must exist a number n in Equation (24') larger than or equal to 1. Since $\sin\theta \leqq 1$, the case of $n=1$ is possible when the following inequality is met.

$$\lambda < 1 \tag{24''}$$

Therefore, the wavelength $\lambda$ of the light source must be shorter than the pitch 1 of the diffraction grating.

For the measurement of engraved patterns as shown in FIG. 17, it is necessary that a direction exists in which the intensity of a diffraction image from a wide diffraction shape becomes zero, and therefore the following inequality derived from (12) must be satisfied.

$$\lambda < d \tag{22'}$$

Accordingly, the range of wavelength used needs to be determined in consideration of the width and pitch of patterns under measurement. This embodiment aims at the measurement of patterns with a width ranging 1–3 $\mu$m and a pitch of 2–3$\mu$m, and thus uses wavelength ranging 300–800 nm.

In the laser light source section 30, a laser beam with a diameter of around 0.4–2.0 mm is broadened by the objective lens 26, conducted through the half mirror 28, and focused by the lens 27 on the slit 34 of the monochromator section 37. As a result, the laser beam entering through the slit 34 has the same shape as of the light beam produced by the light source 23. The half mirror 28 is designed to have a transmission-to-reflection ratio of around 9:1 so that the light beam originating from the light source 23 is preserved.

In the monochromator section 37, the light beam incident through the slit 34 is directed by the mirror 31 and diffracted by the concave diffraction grating 33. Among the diffraction rays, the first order diffraction ray is directed by the mirror 32 to the slit 35. The diffraction angle differs depending on the wavelength, and by turning the concave diffraction grating 33 by the stepping motor 36, a light beam with a specified range of wavelength can be taken out through the slit 35.

In the optical sensor section 47, the lens 40 focuses the real image of the slit 35 via the half mirror 39, the sample surface 61 of the wafer 60 and the mirror 38 on to the slit 44 provided on the front face of the optical sensor 41. The half mirror 39 conducts the light reflected on the sample surface 61 to the slit 43 provided on the front face of the optical sensor 42. The mirror 38 is mounted on the shaft 62 and turned by the stepping motor 52 which is equipped with a speed reduction gear. By controlling the turn angle, the light diffracted at an arbitrary angle on the sample surface 61 is led to the optical sensor 44 located at a fixed position.

In this embodiment, the light is projected perpendicularly to the measurement surface, so that the measuring light desirably reaches the bottom surface of a pit directly without reflecting on the pit wall. For this purpose, the incident angle $\theta$ preferably meets the following inequality for the depth h and opening dimension a of a pit.

$$\sin 0 < \frac{a}{2h}$$

However, in case the incident angle $\theta$ is known and the reflected light from the bottom surface comes out of the pit through a number of reflection on the pit wall, it is possible to measure the depth h by the compensation based on the incident angle $\theta$. In another case where the opening dimension a is sufficiently small and the light is propagated within the pit in the single mode, the depth h can be measured without the need of compensation by the value of $\theta$. On this account, the incident light does not always need to be perpendicular to the sample.

Figure 8:
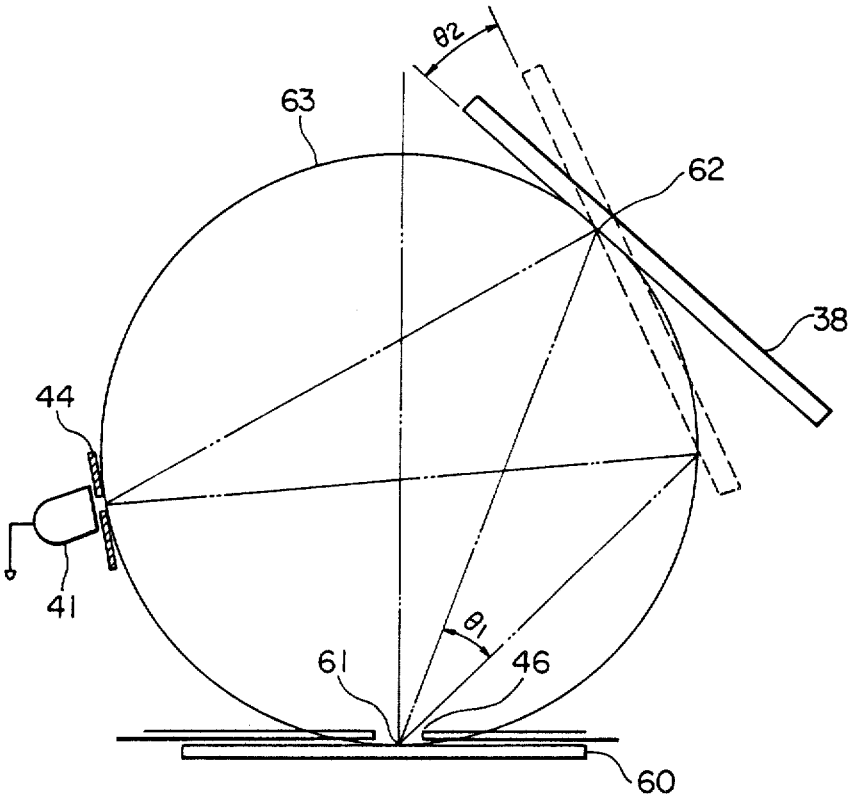
FIG. 8 is a diagram used to explain the control of mirror.

The mirror 38, measurement point 61 and optical sensor 41 are disposed on a same circle 63 as shown in FIG. 8. The mirror 38 has a pivot 62 located on the perpendicular bisector of the line between the measurement point and the optical sensor. This positional relationship facilitates the control of mirror angle for directing the diffraction ray at an arbitrary angle of $\theta$ to the sensitive surface of the fixed optical sensor, since in this case the diffraction angle $\theta_1$ is always consistent with the mirror angle $\theta_2$.

The light beam originating from the light source senction 23 is conditioned to become a monochromatic light with a wavelength width of $\Delta\lambda$ by means of the monochromator 37, and it is projected on to the sample wafer 60. The light beam is diffracted on the sample in specific directions given by the following equation.

$$0 = \sin^{-1}\left(\frac{m\lambda}{l}\right) \tag{24}$$

In some cases, the adjacent diffraction rays must not interfere with each other on the optical sensor surface.

This rule is not applied to the case where the Babinet's principle is applicable. On this account, the following inequality must be satisfied for the length L of light path from the measurement point to the sensor surface and the width $d_l$ of light beam at the sensor surface.

$$L \cdot \frac{\lambda}{l} > d_l \tag{25}$$

From this view point, there exists an allowable maximum value for the width $d_l$ of light beam depending on the sample under measurement. From another view point that the measurement point be small, there exists an allowable maximum value for the width $d_l$ of light beam.

On the other hand, since the image of the output slit 35 in the monochromator section is focused in a magnified scale on the sensor surface, the slit width must be made smaller to obtain a small width $d_l$ of light beam. The slit width $d_s$ is determined in terms of the spectroscopic resolution $\Delta\lambda$, the pitch $d_{g2}$ of diffraction grating, and the focal distance $L_m$ of monochromator, as follows.

$$d_s = L_m \frac{\Delta\lambda}{dg} \tag{26}$$

Figure 20:
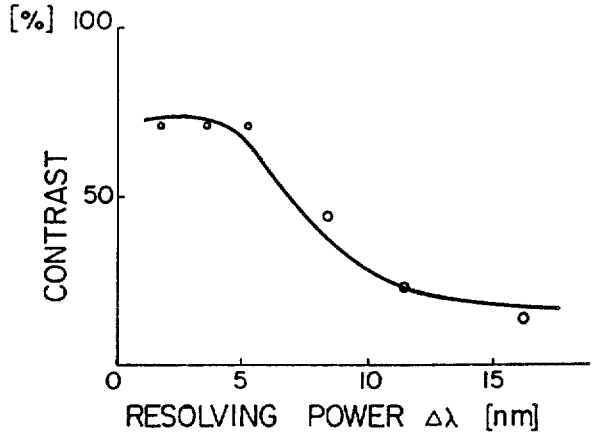
FIG. 20 is a graph showing the relationship between the contrast and the wavelength resolution of the spectrometer.

The contrast of interference plotted against the spectroscopic resolution in FIG. 20 shows that a resolution of 3–5 nm is fairly acceptable. The slit width $d_s$ is preferably as large as possible so as to receive much amount of light, and it is set to the maximum allowed for the determination of the width $d_l$ of light beam as mentioned above. In conclusion, the value of $L_m$ and $d_g$ need to be set so that $d_s$ and $\Delta_l$ fulfill the aforementioned conditions.

c. Operation

By rotating the diffraction grating 33 in the monochromator 37, the light beam projected on to the sample has a wavelength which varies continuously in the range from 300 nm to 800 nm. The mirror 38 is turned following the variation of the wavelength $\lambda$ in accordance with Equation (24), where m is a predetermined number representing the order of diffraction, i.e., m=3 for sampling the diffraction light of the third order.

Figure 21:
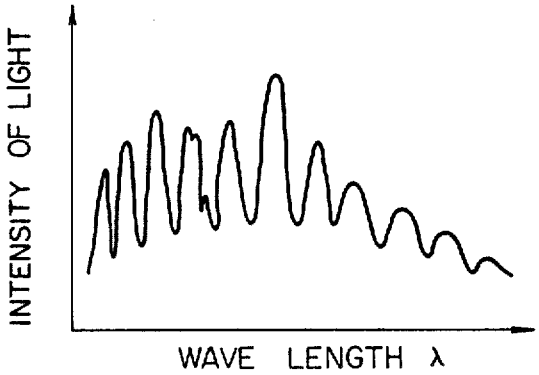
FIG. 21 is a graph showing the waveform of the detected signal.

In this way, the projected light and the diffracted ray of the nth order (n=3) are detected by the optical sensors 41 and 42, respectively, while turning the diffraction grating 33 and mirror 38. The magnitude of light transduced into electrical signal by each optical sensor is amplified, converted into digital data, and processed by the computer. FIG. 21 shows the waveform of the detected signal.

The following describes the process of the measurement data. Initially, the spectroscopic characteristics of the light source 17 is compensated through the division operation for the measured signals $I_o$ and $I_n$ by the spectroscopic characteristic value $I_s$ for the xenon lamp which has been measured in advance and stored in the memory. The value of $I_s$ may alternatively be measured by the sensor 45 and used directly for the division operation.

Figure 22:
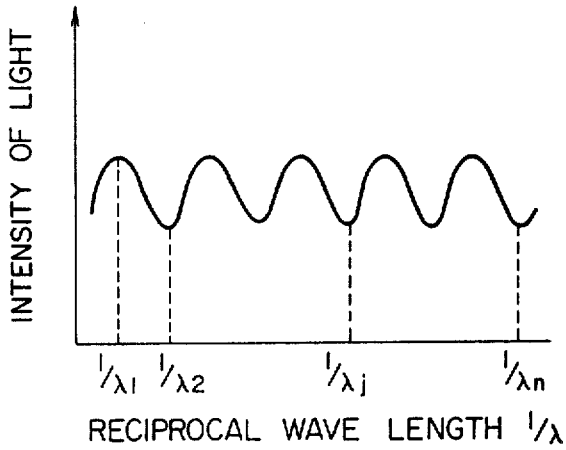
FIG. 22 is a graph showing the waveform of the detected signal after processing.

Next, a $\lambda$-to-$1/\lambda$ conversion process takes place as a preliminary step of obtaining the wavelengths which provide the maximum and minimum values of the variation of interference intensity. The measurement data $I_o$ and $I_n$, which are originally plotted against the wavelength $\lambda$, are rearranged in terms of $1/\lambda$. As a result, a periodic function with the period varying with the wavelength is transformed into a function of a constant period as shown in FIG. 22. This form of function allows the application of the point matching method to the detection of the maximum and minimum points.

Following the $\lambda$-to-$1/\lambda$ conversion, the measurement data is processed for smoothing by the method of averaging several consecutive points of data, and wavelengths $\lambda$ providing the maximum and minimum value are obtained by the point matching method. Here, the obtained values are termed $\lambda_1, \lambda_2, \ldots, \lambda_j, \ldots, \lambda_n$ in the increasing order of the wavelength.

For the diffraction ray of nth order, two beams are out of phase by $\pi$, a maximum value appears when the following simultaneous equations (27) are satisfied, and a minimum value appears when the simultaneous equations (28) are satisfied.

$$\begin{cases} 2k = (i + \frac{1}{2})\lambda_{2j+1} \\ 2k = (i - \frac{1}{2})\lambda_{2j+3} \end{cases} \tag{27}$$

$$\begin{cases} 2k = i \cdot \lambda_{2j} \\ 2k = (i - \frac{1}{2})\lambda_{2j+2} \end{cases} \tag{28}$$

By eliminating i in the above equations, the depth of pit under measurement is obtained in terms of the wavelengths as follows.

$$k = \frac{\lambda_{j+2} \cdot \lambda_j}{2(\lambda_{j+2} - \lambda_j)}, \tag{29}$$

This equation, however, produces a small value of denominator, resulting in the aggravation of computation error. Therefore, the following equation is used.

$$k = \frac{m \cdot \lambda_{j+m}\lambda_j}{4(\lambda_{j+m} - \lambda_j)} \tag{30}$$

The accuracy of computation is further improved by substituting the value of h obtained form Equation (30) into Equation (27) to calculate the value of i and adjusting the intermediate result based on that n is an integer.

The diffraction ray of 0th order is used to provide an increased number of data for the averaging process, so that a noise component with a relatively long period is eliminated. What is calculated from the diffraction ray of 0th order is the thin film on the sample surface, and a noise component with a relatively long period is preferably eliminated, since a small thickness of the film causes a long period of the variation of interference intensity.

The thickness of film with a refractivity of n is calculated by the following equation.

$$d = \frac{n\lambda_{j+1} \cdot \lambda_j}{(\lambda_{j+1} - \lambda_j)} \tag{31}$$

The following describes the method of compensation in determining, by application of this embodiment, the depth h of pits formed in samples as shown in FIGS. 17 and 3 with their surface covered by an oxide film. The light projected on to the sample is reflected on the surface of the oxide film, the interface of the oxide film and the substrate, and the bottom surface of the pit.

Terming the reflectivity of these surfaces to be $\Delta_s$, $\lambda_c$ and $\lambda_b$, respectively, the intensity I of the diffraction ray is expressed as follows.

$$I \alpha \ |\gamma_s|^2 + |\gamma_c|^2 + |\gamma_b|^2 + 2|\gamma_s \cdot \gamma_c|\cos\left(\frac{4\pi}{\lambda}(nd)\right) + 2|\gamma_c \cdot \gamma_b|\cos\left(\frac{4\pi}{\lambda}(d + k - nd)\right) + 2|\gamma_b \cdot \gamma_s|\cos\left(\frac{4\pi}{\lambda}(d + k)\right) \quad (32)$$

In case $\lambda_s$ is sufficiently smaller than $\lambda_c$ and substantially equal to $\lambda_b$, the fifth term becomes dominant, and the depth h is measured smaller than the actual value by the amount of $(n-1)d$. Accordingly, the measured depth h can be compensated from the value of the thickness d and refractivity n of the film.

(4) Third embodiment

Figure 9:
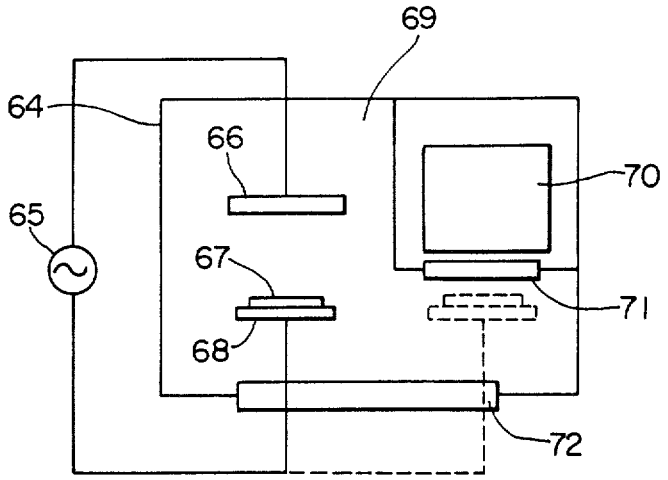
FIG. 9 is a schematic diagram showing the present invention applied to the etching equipment.

Still another embodiment of the present invention in which the depth measuring apparatus is linked with a pattern etching equipment as shown in FIG. 9 will be described. The etching equipment 64 consists of a pair of parallel planar electrodes 66 and 68, a high frequency power source 65 and a vacuum chamber 69. After the etching process has completed, the wafer 67 placed on the lower electrode 68 is transported with it by a wafer conveyor 72 to the position beneath the measurement section 70. Here, the light is projected to the wafer 67 through the window, and the depth h of etching is measured.

In this embodiment, the wafer inside the vacuum chamber 69 can be measured from outside by utilization of the non-contact depth measurement technique according to the present invention. Consequently, if the depth of etching is found too small, the wafer is readily fed back to the etching station for an extra process, whereby the overall processing time can be reduced.

The following describes various arrangements for sampling the diffraction ray of a specific order following the varying diffraction angle caused by the variation of the wavelength of the measuring light.

Figure 10:
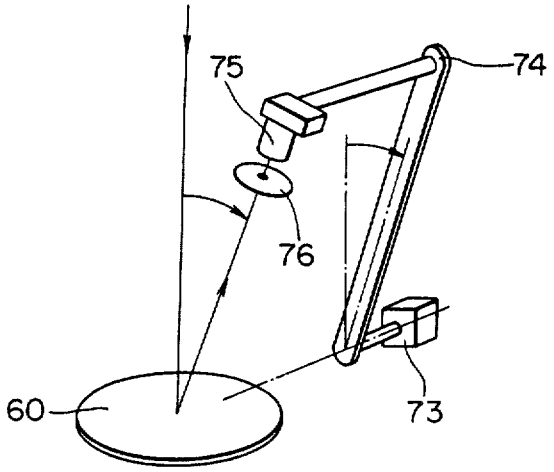
FIGS. 10 through 14 are illustrations showing various forms of the reflection light sampling device in the inventive apparatus.

The first arrangement shown in FIG. 10 comprises a stepping motor 73, an arm 74, an optical sensor 75, and an aperture 76. The optical sensor 75 is moved by the stepping motor 73 following the diffraction ray with its direction varying with the variation of the wavelength of measuring light.

Figure 11:
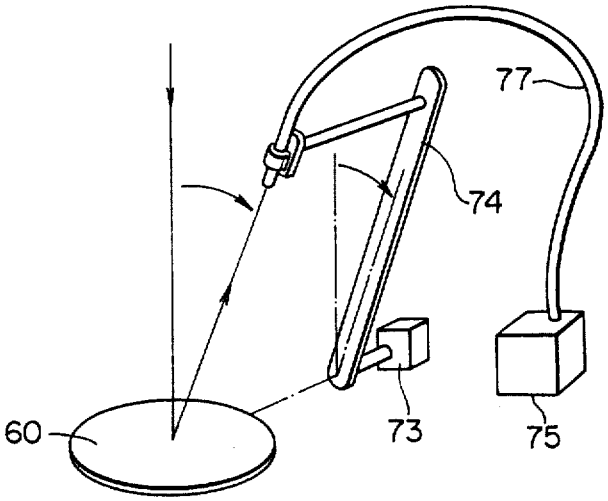

The second arrangement shown in FIG. 11 uses an optical fiber cord 77 for conducting the sampled light from the end of the arm 74, where the sensor is mounted in the previous arrangement, to the optical sensor 75 which is located at a fixed position.

Figure 12:
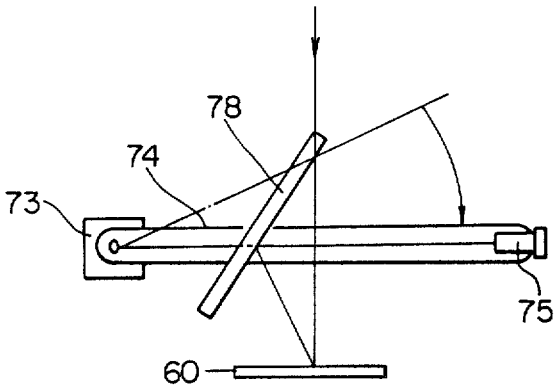

The third arrangement shown in FIG. 12 uses a half mirror 78 so that the stepping motor 73 has its rotary shaft in a different position. This arrangement is effective to reduce the size of equipment.

Figure 13:
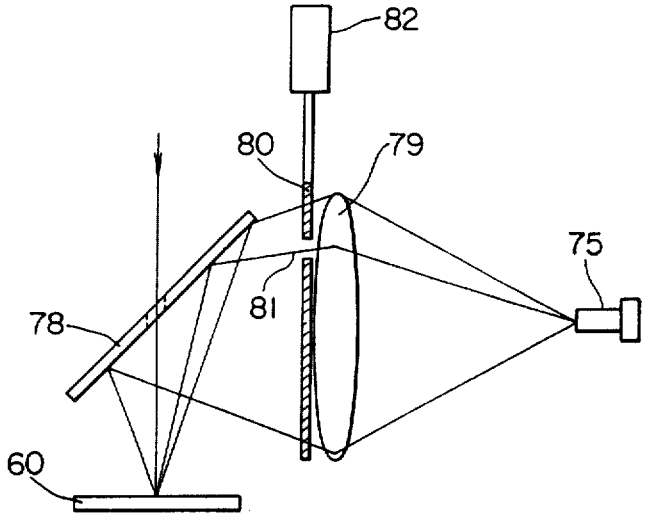

The fourth arrangement shown in FIG. 13 comprises a half mirror 78, a lens 79 and an aperture 80. The aperture 80 has its opening portion 81 variable by being moved by a X-Y drive system 82. This arrangement also allows the optical sensor 75 to be placed at a fixed position. For the measurement of a sample in compliance with the Babinet's principle, the intensity of diffraction ray varies in response to the variation of the wavelength simultaneously at all order of diffraction except for the 0th order, and therefore it is not necessary to sample the diffracted ray of a specific order. Accordingly, the whole diffraction light excluding the 0th order ray may be sampled by provision of an aperture which interrupts only the 0th order ray, whereby a large amount of light can be sampled. In case diffraction images in one area provide a simultaneous variation of intensity, the aperture may be shaped to sample the whole light in that area, so that the intensity of sampled light can be increased. Alternatively, the half mirror 78 may be shaped to have a punched hole at its center so that the diffraction ray of 0th order is removed.

Figure 14:
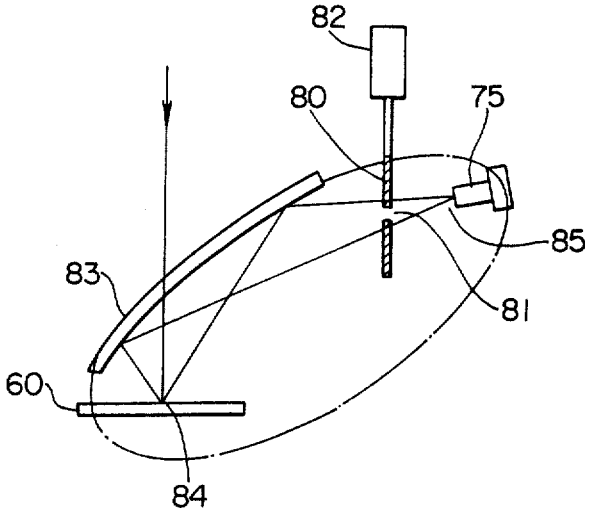

Finally, the fifth arrangement shown in FIG. 14 uses a mirror 83 of the revolving ellipsoidal shape having focal points 84 and 85, in place of the lens 79 in the previous arrangement shown in FIG. 13.

Although several arrangements for sampling the diffraction ray have been explained, the key of the present invention is to sample effectively a diffraction ray other than the 0th order ray, and any other arrangement suitable for this purpose may also be employed.

According to the present invention, as described above, the depth of pits and grooves formed in a substrate can be measured accurately the diffraction method through the sampling of light reflected on the pit or groove bottom surface and on the unworked surface in a substantially equal intensity even if the area of pit or groove portion is far smaller than the area of unworked portion, namely, etched pits and grooves with a small opening area can be measured.

We claim:

1. An apparatus for measuring the depth of a fine engraved pattern comprising:

means for irradiating a light beam with a variable wavelength to a sample under measurement;

means for detecting a diffraction ray excluding that of the 0th order created on said sample in response to the irradiation by the [first mentioned] *irradiating* means; and means for calculating the dimension of a pattern engraved in said sample basing on signals produced by the [first and second mentioned means] *irradiating means and the detecting means.*

2. An apparatus according to claim 1, wherein said light beam is irradiated to said sample substantially perpendicularly with an allowance of entry angle with respect to the normal being expressed as:

$$\Delta 0 < \sin^{-1}\left(\frac{a}{2k}\right),$$

where a denotes the dimension of opening of said pattern and h denotes the design value of the depth of said pattern.

3. An apparatus according to claim 1, wherein said means for irradiating a light beam comprises a spectroscope which provides a signal for identifying the wavelength of said light beam; said detection means comprises a mirror of revolving elipsoidal shape with its focal points being substantially coincident with a measurement point on said sample and a detecting point of said diffraction ray, and a sensor with a diffusion plate for diffusing said diffraction ray entering said measuring point; and said calculation means has an ability of determining the wavelength which provide a peak value in diffraction intensity in response to the irradiation of light beam with a variable wavelength.

4. An apparatus for measuring the depth of a fine engraved pattern comprising:

means for irradiating a light beam with a variable wavelength to a sample under measurement;

means for detecting a diffraction ray excluding that of the 0th order created on said sample in response to the irradiation by the [first mentioned] *irradiating* means;

means for calculating the dimension of a pattern engraved in said sample basing on signals produced by the [first and second mentioned means] *irradiating means and the detecting means*; and means for etching said sample to form said pattern.

5. An apparatus for measuring the depth of a fine engraved pattern comprising:

means for irradiating a light beam with a variable wavelength to a sample under measurement;

means for detecting selectivity a high order diffraction ray other than that of the 0th order created on said sample in response to the irradiation by the [first mentioned] *irradiating* means; and means for calculating the dimension of a pattern engraved in said sample basing on signals produced by the [first and second mentioned means] *irradiating means and the detecting means.*

6. An apparatus according to claim 5, wherein said light beam is irradiated to said sample substantially perpendicularly with an allowance of entry angle with respect to the normal being expressed as:

$$\Delta 0 < \sin^{-1}\left(\frac{a}{2k}\right),$$

where a denotes the dimension of opening of said pattern, and h denotes the design value of the depth of said pattern.

7. An apparatus according to claim 5, wherein said [detection] *detecting* means comprises an aperture which can be moved in a two-dimensional space.

8. An apparatus according to claim 5, wherein said [irradiation] *irradiating* means comprises a light source which produces a light beam with wavelengths ranging 300–800 nm, a spectroscope having a diffraction grating driven by a stepping motor, and a slit with a slit width $d_s$ for a spectroscopic width $\Delta\lambda$ from 3 to 5 nm expressed as:

$$d_s = L_m \frac{\Delta\lambda}{d_g},$$

where $L_m$ denotes the focal distance of the spectroscope, and $d_g$ denotes the pitch of the diffraction grating; said [detection] *detecting* means comprises a stepping motor which drives a reflection mirror for directing a diffraction ray from said sample to a sensor located at a fixed position; said calculation means comprises an analog-to-digital converter, and a processor with abilities of converting a value of wavelength into a reciprocal value of wavelength and calculating the dimension of said pattern from the ordinal number of wavelength corresponding to the peak value of intensity distribution of said diffraction ray.

9. An apparatus according to claim 8, wherein said reflection mirror and sensor in said [detection] *detecting* means and a measurement point on said sample are located substantially on a circle, said reflection mirror having a turning axis located on a perpendicular bisector of a line segment between said measurement point and said sensor.

10. An apparatus according to claim 8, wherein said reflection mirror for directing a diffraction ray from said sample to a fixed position in correspondence to the wavelength $\lambda$ of a light beam from said irradiation means is turned to an angular position $\theta$ expressed as:

$$0 = \sin^{-1}\left(\frac{m\lambda}{l}\right),$$

where l denotes the pitch of pattern engraved in the sample and m denotes the order of the diffraction ray.

11. An apparatus according to claim 8, wherein said stepping motor in said [detection] *detecting* means drives an arm on which said sensor is mounted.

12. An apparatus according to claim 8, wherein said stepping motor in said [detection] *detecting* means drives an arm mounted an end of an optical fiber cord for conducting a diffraction ray to said sensor.

13. An apparatus for measuring the depth of a fine engraved pattern comprising:

means for irradiating a light beam with a variable wavelength for detecting selectively a high order diffraction ray other than that of the 0th order created on said sample in response to the irradiation by the [first mentioned] *irradiating* means;

means for calculating the dimension of a pattern engraved in said sample basing on signals produced by the [first and second mentioned means] *irradiating means and the detecting means*; and means for etching said sample to form said pattern.

*14. An apparatus for measuring the depth of a fine engraved pattern comprising:*

*irradiation means for irradiating a light beam having a variety of wavelengths to a sample under measurement to cause interference;*

*detection means for detecting an intensity of a diffraction ray excluding the diffraction ray of the 0th order created on said sample in response to the irradiation by the irradiation means;*

*production means for producing a variation of an intensity of the diffraction ray; and*

*means for calculating the depth of the pattern engraved in said sample basing on signals produced by the production means and the detection means.*

*15. An apparatus according to claim 14, wherein said production means includes spectroscopic means for varying the wavelength of the diffraction ray.*

*16. An apparatus according to claim 15, wherein said irradiation means includes said spectroscopic means.*

*17. An apparatus according to claim 14, wherein said light beam is irradiated to said sample substantially perpendicularly with an allowance of entry angle with respect to the normal being expressed as:*

$$\Delta\theta < \sin^{-1}(a/2h),$$

*where a denotes the dimension of opening of said pattern, and h denotes the design value of the depth of said pattern.*

*18. An apparatus according to claim 14, wherein said irradiation means includes a light source which produces*

*the light beam with wavelengths in the range of 300–800 nm.*

*19. An apparatus according to claim 14, wherein said production means includes spectroscopic means disposed between said sample and said detection means.*

*20. An apparatus for measuring the depth of a fine engraved pattern comprising:*

*irradiation means for irradiating a light beam having a variety of wavelengths to a sample under measurement to cause interference;*

*detection means for detecting an intensity of a diffraction ray excluding the diffraction ray of the 0th order created on said sample in response to the irradiation by the irradiation means;*

*production means for producing a variation of an intensity of the diffraction ray;*

*means for calculating the depth of the pattern engraved in said sample basing on signals produced by the production means and the detection means; and* means for etching said sample to form said pattern.

*21. An apparatus for measuring the depth of a fine engraved pattern comprising:*

*irradiation means for irradiating a light beam having a variety of wavelengths to a sample under measurement;*

*detection means for detecting an intensity of a diffraction ray excluding the diffraction ray of the 0th order created on said sample in response to the irradiation by the irradiation means;*

*spectroscopic means for producing variable wavelengths of the diffraction ray; and*

*means for calculating the depth of the pattern engraved in said sample basing on signals produced by the spectroscopic means and the detection means.*

*22. An apparatus according to claim 21, wherein said light beam is irradiated to said sample substantially perpendicularly with an allowance of entry angle with respect to the normal being expressed as:*

$$\Delta\theta < \sin^{-1}(a/2h),$$

*where a denotes the dimension of opening of said pattern, and h denotes the design value of the depth of said pattern.*

*23. An apparatus according to claim 21, wherein said irradiation means comprises a light source which produces the light beam with wavelengths in the range of 300–800 nm.*

*24. An apparatus for measuring the depth of a fine engraved pattern comprising:*

*irradiation means for irradiating a light beam having a variety of wavelengths to a sample under measurement;*

*detection means for detecting an intensity of a diffraction ray excluding the diffraction ray of the 0th order created on said sample in response to the irradiation by the irradiation means;*

*spectroscopic means for producing variable wavelength of the diffraction ray;*

*means for calculating the depth of the pattern engraved in said sample basing on signals produced by the production means and the detection means; and*

*means for etching said sample to form said pattern.*

*25. A method of measuring the depth of a fine engraved pattern comprising steps of:*

*irradiating by an irradiating means a light beam having a variety of wavelengths to a sample under measurement to cause interference;*

*detection by a detecting means an intensity of a diffraction ray excluding the diffraction ray of the 0th order created on said sample in response to the irradiating of the light beam; or*

*producing by a production means a variation of an intensity of the diffraction ray; and*

*calculating the depth of the pattern engraved in said sample basing on signals produced by the production means and the detection means.*

*26. A method for measuring the depth of a fine engraved pattern comprising steps of:*

*irradiating by an irradiating means a light beam having a variety of wavelengths to a sample under measurement;*

*detecting by a detecting means an intensity of a diffraction ray excluding the diffraction ray of the 0th order created on said sample in response to irradiating of the light beam;*

*producing by a spectroscopic means variable wavelengths of the diffraction ray; and*

*calculating the depth of the pattern engraved in said sample in accordance with signals produced by the spectroscopic means and the detection means.*

* * * * *